(12) United States Patent
Tuttle

(10) Patent No.: US 8,643,474 B2
(45) Date of Patent: Feb. 4, 2014

(54) COMPUTER WITH RFID INTERROGATOR

(75) Inventor: Mark E. Tuttle, Meridian, ID (US)

(73) Assignee: Round Rock Research, LLC, Jersey City, NJ (US)

( * ) Notice: Subject to any disclaimer, the term of this patent is extended or adjusted under 35 U.S.C. 154(b) by 768 days.

(21) Appl. No.: 12/115,114

(22) Filed: May 5, 2008

(65) Prior Publication Data

US 2009/0273448 A1  Nov. 5, 2009

(51) Int. Cl.
*H04Q 5/22* (2006.01)
*G08B 13/14* (2006.01)
*G06Q 30/00* (2012.01)

(52) U.S. Cl.
USPC ..... 340/10.3; 340/10.1; 340/572.1; 705/14.4; 705/14.51

(58) Field of Classification Search
USPC ............... 340/10.3, 10.6, 10; 705/14.4–14.73
See application file for complete search history.

(56) References Cited

U.S. PATENT DOCUMENTS

| | | | |
|---|---|---|---|
| 4,072,850 A | 2/1978 | McGlynn | |
| 4,075,632 A | 2/1978 | Baldwin et al. | |
| 4,107,689 A | 8/1978 | Jellinek | |
| 4,168,679 A | 9/1979 | Ikeura et al. | |
| 4,237,830 A | 12/1980 | Stivender | |
| 4,335,695 A | 6/1982 | Phipps | |
| 4,398,172 A | 8/1983 | Carroll et al. | |
| 4,497,057 A | 1/1985 | Kato et al. | |
| 4,524,745 A | 6/1985 | Tominari et al. | |
| 4,551,803 A | 11/1985 | Hosaka et al. | |
| 4,552,116 A | 11/1985 | Kuroiwa et al. | |
| 4,714,925 A | 12/1987 | Bartlett | |
| 4,728,922 A | 3/1988 | Christen et al. | |
| 4,843,557 A | 6/1989 | Ina et al. | |
| 4,853,850 A | 8/1989 | Krass, Jr. et al. | |
| 4,875,391 A | 10/1989 | Leising et al. | |
| 4,878,050 A | 10/1989 | Kelley | |
| 4,908,792 A | 3/1990 | Przybyla et al. | |
| 4,926,182 A | 5/1990 | Ohta et al. | |
| 4,986,229 A | 1/1991 | Suzuki et al. | |
| 5,002,031 A | 3/1991 | Kako | |
| 5,019,799 A | 5/1991 | Oshiage et al. | |
| 5,054,569 A | 10/1991 | Scott et al. | |
| 5,058,044 A | 10/1991 | Sewart et al. | |
| 5,091,858 A | 2/1992 | Paielli | |
| 5,113,427 A | 5/1992 | Ryoichi et al. | |
| 5,150,609 A | 9/1992 | Ebner et al. | |
| 5,172,321 A | 12/1992 | Ghaem et al. | |
| 5,189,612 A | 2/1993 | Lemercier et al. | |

(Continued)

FOREIGN PATENT DOCUMENTS

DE  3445668 C1  1/1986
EP  0 456 425 A1  11/1991

(Continued)

*Primary Examiner* — Daniel Wu
*Assistant Examiner* — Mohamed Barakat
(74) *Attorney, Agent, or Firm* — Lerner, David, Littenberg, Krumholz & Mentlik, LLP

(57) ABSTRACT

Methods and apparatus, including computer program products, for a computer with a radio frequency identification (RFID) reader. A system includes a processor, a store of codes representing goods and services cross-referenced to supplemental information, a radio frequency identification (RFID) interrogator, an input/output tag (IO), and a memory including a process that matches a received code from the RFID interrogator to a code in the store of codes and to display supplemental information of a good or service on the IO tag.

6 Claims, 4 Drawing Sheets

(56) References Cited

U.S. PATENT DOCUMENTS

| | | | |
|---|---|---|---|
| 5,196,846 A | 3/1993 | Brockelsby et al. | |
| 5,278,759 A | 1/1994 | Berra et al. | |
| 5,289,369 A | 2/1994 | Hirshberg | |
| 5,345,902 A | 9/1994 | Kalail, Sr. et al. | |
| 5,379,042 A | 1/1995 | Henoch | |
| 5,420,794 A | 5/1995 | James | |
| 5,422,624 A | 6/1995 | Smith | |
| 5,459,660 A | 10/1995 | Berra | |
| 5,483,827 A | 1/1996 | Kulka et al. | |
| 5,586,034 A | 12/1996 | Takaba et al. | |
| 5,598,898 A | 2/1997 | Mutoh et al. | |
| 5,606,306 A | 2/1997 | Mutoh et al. | |
| 5,610,574 A | 3/1997 | Mutoh et al. | |
| 5,619,412 A | 4/1997 | Hapka | |
| 5,621,380 A | 4/1997 | Mutoh et al. | |
| 5,621,381 A | 4/1997 | Kawachi et al. | |
| 5,621,412 A | 4/1997 | Sharpe et al. | |
| 5,631,501 A | 5/1997 | Kubota et al. | |
| 5,634,190 A | 5/1997 | Wiedeman | |
| 5,635,693 A | 6/1997 | Benson et al. | |
| 5,649,296 A | 7/1997 | MacLellan et al. | |
| 5,660,246 A | 8/1997 | Kaman | |
| 5,664,113 A | 9/1997 | Worger et al. | |
| 5,677,667 A | 10/1997 | Lesesky et al. | |
| 5,686,920 A | 11/1997 | Hurta et al. | |
| 5,710,703 A | 1/1998 | Kirn et al. | |
| 5,712,899 A | 1/1998 | Pace, II | |
| 5,717,830 A | 2/1998 | Sigler et al. | |
| 5,719,550 A | 2/1998 | Bloch et al. | |
| 5,721,678 A | 2/1998 | Widl | |
| 5,724,426 A | 3/1998 | Rosenow et al. | |
| 5,726,630 A | 3/1998 | Marsh et al. | |
| 5,729,538 A | 3/1998 | Dent | |
| 5,729,740 A | 3/1998 | Tsumura | |
| 5,749,984 A | 5/1998 | Frey et al. | |
| 5,758,300 A | 5/1998 | Abe | |
| 5,769,051 A | 6/1998 | Bayron et al. | |
| 5,803,043 A | 9/1998 | Bayron et al. | |
| 5,809,142 A | 9/1998 | Hurta et al. | |
| 5,894,266 A | 4/1999 | Wood, Jr. et al. | |
| 5,995,898 A | 11/1999 | Tuttle | |
| 6,006,148 A | 12/1999 | Strong | |
| 6,112,152 A | 8/2000 | Tuttle | |
| 6,129,279 A * | 10/2000 | Colley et al. | 235/462.16 |
| 7,250,862 B2 * | 7/2007 | Bornhoevd et al. | 340/572.1 |
| 7,295,101 B2 * | 11/2007 | Ward et al. | 340/10.1 |
| 7,443,282 B2 * | 10/2008 | Tu et al. | 340/10.1 |
| 7,619,521 B2 * | 11/2009 | Williams et al. | 340/572.1 |
| 7,711,598 B2 * | 5/2010 | Perkowski | 705/14.51 |
| 7,853,477 B2 * | 12/2010 | O'Shea et al. | 705/14.1 |
| 2001/0049734 A1 * | 12/2001 | Suwabe et al. | 709/225 |
| 2006/0168644 A1 * | 7/2006 | Richter et al. | 726/2 |
| 2007/0024436 A1 * | 2/2007 | Bandy | 340/505 |
| 2007/0050305 A1 * | 3/2007 | Klein | 705/67 |
| 2008/0001751 A1 * | 1/2008 | Gieseke et al. | 340/572.1 |

FOREIGN PATENT DOCUMENTS

| | | |
|---|---|---|
| EP | 0 725 377 A2 | 8/1996 |
| FR | 2 647 930 A1 | 12/1990 |
| GB | 2 169 173 A | 7/1986 |
| GB | 2277844 A | 11/1994 |
| WO | 90/12365 A1 | 10/1990 |
| WO | 91/18452 A1 | 11/1991 |
| WO | 93/04353 A1 | 3/1993 |
| WO | 94/07206 A1 | 3/1994 |
| WO | 95/01607 A1 | 1/1995 |
| WO | 98/25248 A1 | 6/1998 |

* cited by examiner

COMPUTER WITH RFID INTERROGATOR

BACKGROUND

The present invention relates to data processing by digital computer, and more particularly to a computer with a radio frequency identification (RFID) interrogator.

RFID is a technology that incorporates the use of electromagnetic or electrostatic coupling in the radio frequency (RF) portion of the electromagnetic spectrum to uniquely identify an object, animal, or person. With RFID, the electromagnetic or electrostatic coupling in the RF (radio frequency) portion of the electromagnetic spectrum is used to transmit signals. A typical RFID system includes an antenna and a transceiver, which reads the radio frequency and transfers the information to a processing device (reader) and a transponder, or RF tag, which contains the RF circuitry and information to be transmitted. The antenna enables the integrated circuit to transmit its information to the reader that converts the radio waves reflected back from the RFID tag into digital information that can then be passed on to computers that can analyze the data.

Other features and advantages of the invention are apparent from the following description, and from the claims.

SUMMARY

The present invention provides methods and apparatus, including computer program products, for a computer with a radio frequency identification (RFID) interrogator.

In general, in one aspect, a system including a processor, a store of Electronic Product Codes (EPCs) cross-referenced to respective products or services, a radio frequency identification (RFID) interrogator programmed to interrogate a RFID tag affixed to an article and receive an EPC in response to the interrogation, and a memory including an operating system (OS) and network browser having a first helper application and a second helper application, the first helper application querying the store to identify information associated with the article represented by the received EPC, the second helper application scanning content currently displayed by the network browser, and displaying supplemental information pertaining to the identified article if the scanned content relates to the identified article.

In another aspect, the invention features a system including a processor, a store of codes representing goods and services cross-referenced to supplemental information, a radio frequency identification (RFID) interrogator, an input/output tag (IO), and a memory including a process that matches a received code from the RFID interrogator to a code in the store of codes and to display supplemental information of a good or service on the IO tag.

In another aspect, the invention features a method including, in a computer system, receiving a code from a radio frequency identification (RFID) tag in response to an interrogation by a RFID reader, identifying a good or service represented by the code, acquiring supplemental information relating to the identified good or service, parsing content currently displayed on a user interface (UI), determining if the identified good or service matches any of the parsed content and if the identified good or service matches any of the parsed content, displaying the supplemental information.

DETAILED DESCRIPTION

Figure 1:
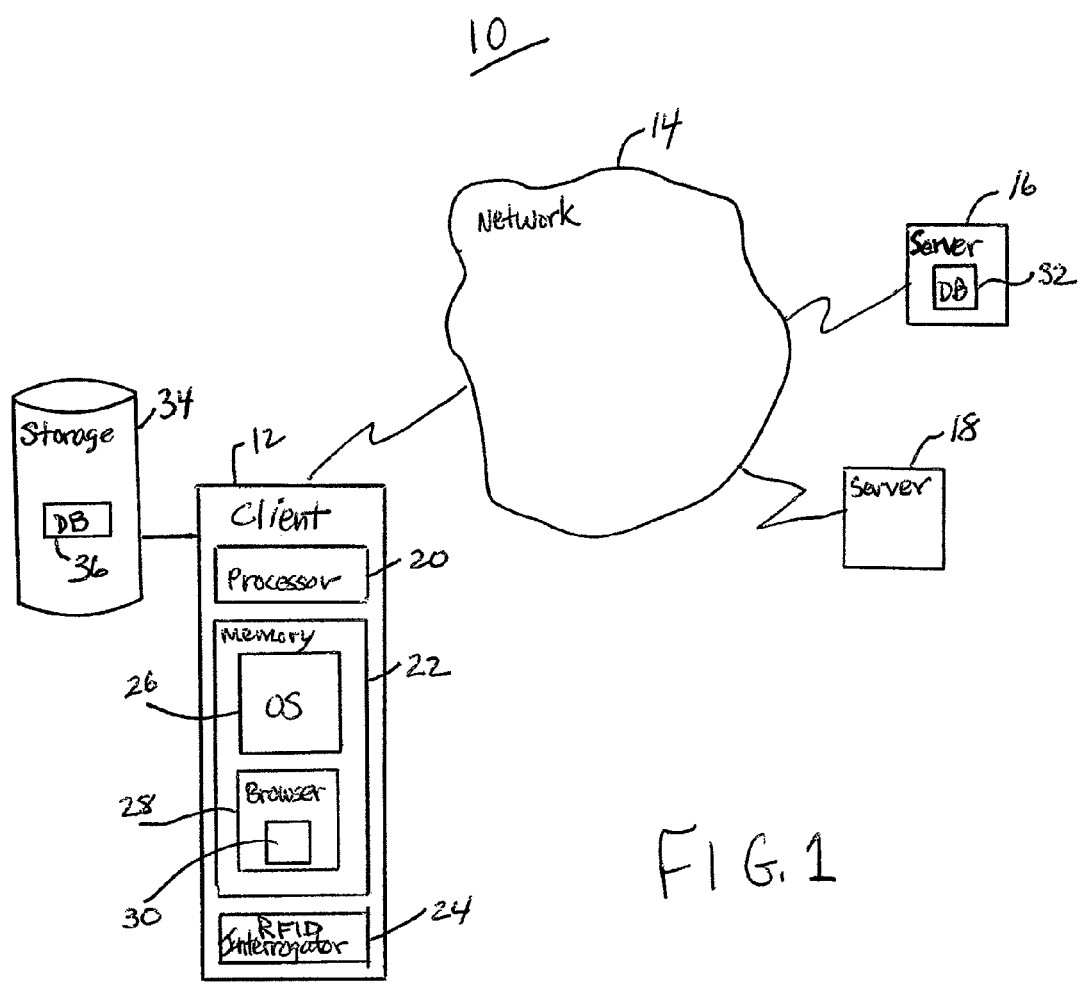
FIG. 1 is a block diagram of an exemplary system.

As shown in FIG. 1, an exemplary system 10 includes a client 12 linked to a network 14 of interconnected computers (e.g., the Internet). In other implementations, the network 14 is a private network or a combination of public and private networks. The network 14 is linked to one or more servers 16, 18. The client 12 can be a personal computer, laptop, and so forth. The client 12 includes a processor 20, memory 22 and a radio frequency identification (RFID) interrogator (i.e., RFID reader) 24. Memory 22 includes an operating system (OS) 26 and network browser 28 (e.g., Web browser). In general, a browser is an application program that provides a way to look at and interact with information on a network such as the World Wide Web ("Web"). For example, a Web browser is a client program that uses HTTP (Hypertext Transfer Protocol) to make requests of Web servers throughout the Internet on behalf of the browser user. Examples of Web browsers include Firefox®, Opera®, and Netscape Navigator®. With network browser 28 a user can view Web pages that contain content, such as text, images, and/or other multimedia, and navigate between Web pages using hyperlinks.

Memory 22 and network browser 28 include one or more helper applications 30. These helper applications 30 can scan content being displayed and, in one example, used in conjunction with the RFID interrogator 24 and one of the servers 16, 18 to target supplemental information for the user on the client 12.

One or more of the servers 16, 18 includes a database 32 that contains at least a table of RFID codes (also referred to as Electronic Product Codes (EPCs)) cross-referenced to particular products or services. For example, a RFID tag residing on a particular article of clothing, such as jeans, has an EPC cross-referenced to that type of clothing (or manufacturer(s)) in the database 32. In one particular example, the database 32 is an Object Naming Service (ONS) system database. ONS aids a user to discover information about a product and related services from EPC. The EPC is a family of coding schemes. The EPC is a low-cost method of tracking goods using RFID technology. EPC codes are designed to identify each item manufactured, as opposed to just the manufacturer and class of products, as bar codes do today.

Figure 2:
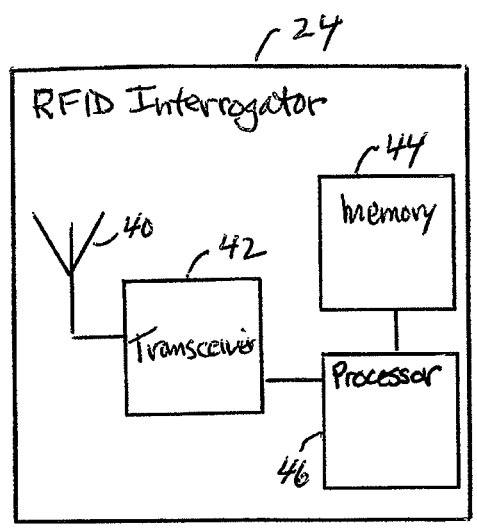
FIG. 2 is a block diagram of an exemplary radio frequency identification (RFID) interrogator.

As shown in FIG. 2, the RFID interrogator 24 includes an antenna 40, transceiver 42, memory 44 and processor 46. Transceiver 42, memory 44 and processor 46 can be implemented as a microcontroller. Memory 44 and processor 46 may be implemented as a microcontroller. The RFID interrogator 24 is programmable and can perform, in one example, Time Division Multiplexing (TDM), with the transceiver 42 and antenna 40. Data downloaded from a RFID tag can be stored in memory 44.

Figure 3:
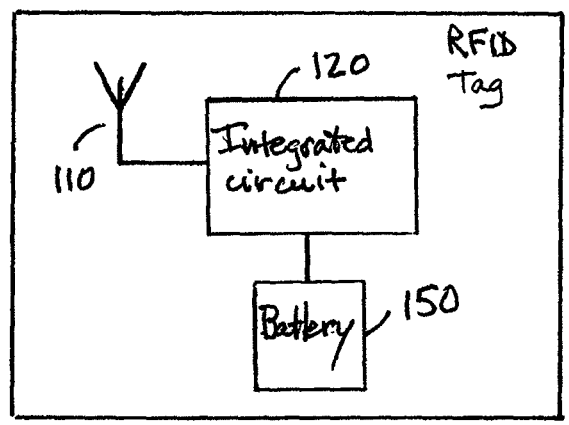
FIG. 3 is a block diagram of an exemplary RFID tag.

As shown in FIG. 3, an exemplary RFID tag 100 includes an antenna 110 linked to an integrated circuit 120 and in some configurations, a battery 150. When triggered by radio waves from a RFID interrogator, the integrated circuit 120 fetches data (e.g., time stamp, EPC and so forth) from its memory and sends it out to the RFID interrogator, such as RFID interrogator 24.

RFID tags such as EPC tags can be affixed to almost any article, such as inventory items and consumer goods, or positioned proximately to a service provider location. In one example, if a user is viewing a Web page with the network browser 28 and the interrogator 24 detects an EPC tag on an article within the interrogator's range, one helper application 30 sends the received EPC code to the database 32 to identify the specific article represented by the received EPC code; this is generally referred to as an EPC lookup. EPC lookup triggers another helper application 30 to scan the content currently displayed by the network browser 28. If the identified article is related to, or matches, content currently being displayed on the Web page, the helper application 30 can provide supplemental information to the network browser 28 for display to the user. This supplemented information is stored along with EPCs in the database 32. For example, if the user is viewing a page relating to printers and the RFID interrogator 24 picks up an EPC from a RFID tag affixed in a nearby computer store, helper application 30 can send supplemental information relating to the computer store for display in the network browser 28, such as current promotions relating to the purchase of printers, or printer supplies, at the nearby computer store.

More generally, when interrogator 24 reads a RFID tag attached, for example, to a consumer product, the RFID's unique EPC is passed from the RFID interrogator 24 to helper application 30, which, in turn, queries the database 32 to identify the product/service associated with EPC code and in some examples, where supplemental information about the identified product is stored in the network 14. Using ONS as an example, the ONS database 32 points the helper application 30 to a server where a file containing information about that product/service is stored. The helper application 30 can retrieve this file information about the product/service and use the information in conjunction with content currently being displayed by the user to target supplemental information, such as advertising, for display to the user through the network browser 28. This specific targeting of the supplemental information to the user avoids annoying pop-up advertisement that might not be relevant to the user.

In another example, the client 12 includes a lookup table in memory 22 or a storage tag 34 that includes a database 36. When the interrogator 24 reads and receives an EPC from a RFID tag, the lookup table or database 36 includes supplemental information cross-referenced to the received EPC that can be displayed through the network browser 30 to the user.

Supplemental information presented in this manner can be used in many other applications. For example, in a Point of Sale (POS) application, a RFID reader linked to a computer, such as a cash register, is used to scan items at a checkout. Each item has one of more affixed RFID tags. As an item is scanned and an EPC returned, the computer identifies the product from a database of EPCs. This database can reside at the POS, or on another system in a local area network (LAN), or on a server in another network, such as a Wide Area Network (WAN). Once a product is identified, supplemental information can be displayed to the consumer at the POS and/or one or more displays proximate to the POS location, such as on a display tag at the POS or a display tag in a store window. This displayed information can be used to encourage other consumers to purchase the scanned item or other related items.

In another example, supplemental information about the item scanned may contain safety information or other types of information, such as that the scanned item must remain frozen, or the scanned item is fragile, or the scanned item must remain above freezing, or the scanned item must remain right side up, or the scanned item is hazardous, and so forth.

In another example, a computer system with a RFID reader and display is mounted in a vehicle. For example, such a system can be mounted in a cab of a fork lift so that when articles being moved by a fork lift driver are scanned supplemental information is displayed to the driver, such as safety information. Supplemental information can also be displayed to a driver who is transporting goods in a truck.

Figure 4:
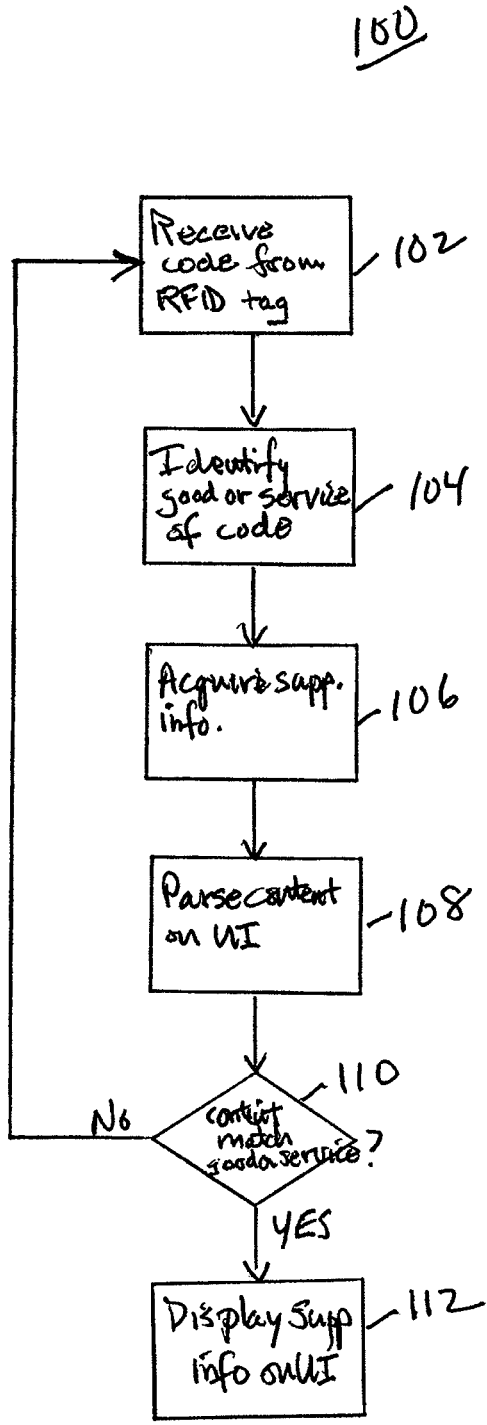
FIG. 4 is a flow diagram.
Like reference numbers and designations in the various drawings indicate like elements.

As shown in FIG. 4, a process 100 includes receiving (102) a code from a radio frequency identification (RFID) tag in response to an interrogation by a RFID reader. Process 100 identifies (104) a good or service represented by the code.

Process 100 acquires (106) supplemental information relating to the identified good or service.

Process 100 parses (108) content currently displayed on a user interface (UI).

Process 100 determines (110) if the identified good or service matches any of the parsed content.

If the identified good or service matches any of the parsed content, process 100 displays (112) the supplemental information. In some embodiments, the supplemental information is displayed on one or more remote display units.

The invention can be implemented to realize one or more of the following advantages.

A user of a network browser whose computer system interrogates Electronic Product Code (EPC) tags proximate to the user's location is presented supplemental product information pertaining to a product associated with a received and proximate EPC tag. The presentation of information can be targeted by using content currently displayed to a user to make the supplemental information more pertinent. This targeted presentation of supplemental product information improves the relevancy of supplemental information presented and viewed by the user and improves opportunities for a commercial advertiser to reach the user with supplemental information.

Targeted supplemental information can be displayed on adjacent output tags for others to view. In a retail setting, supplemental information can be displayed specific to an item being scanned at a checkout. In a commercial setting, supplemental information can be displayed relating to products being scanned, such as, for example, they must remain frozen, or they are fragile, or they must remain above freezing, or must remain right-side up, or they are hazardous, and so forth.

A computer or processing tag with a RFID interrogator can be mounted on the front of a transportation tag, such as a forklift, with a display to an operator. The operator can received information related to items being moved.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage tag or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory tags for storing instructions and data. Generally, a computer will also include, or be operatively coupled to receive data from or transfer data to, or both, one or more mass storage tags for storing data, e.g., magnetic, magneto optical disks, optical disks or solid state devices. Information carriers suitable for embodying computer program instructions and data include all forms of non volatile memory, including by way of example semiconductor memory tags, e.g., EPROM, EEPROM, and flash memory tags; magnetic disks, e.g., internal hard disks or removable disks; magneto optical disks; CD ROM and DVD-ROM disks; or solid state devices. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A system comprising:
    a processor;
    a radio frequency identification (RFID) interrogator programmed to interrogate an RFID tag affixed to an article and receive an electronic product code in response to the interrogation, wherein the electronic product code is uniquely associated with the article; and
    a memory including an operating system (OS) and a network browser,
    wherein content is displayed by the network browser prior to interrogation by the RFID interrogator,
    wherein the article is identified by performing an electronic product code lookup and, following identification of the article, the content displayed by the network browser is automatically scanned to determine if the article is related to the content being displayed, and
    wherein, only when the article is related to the content being displayed by the network browser, the network browser accesses supplemental information associated with the electronic product code and prepares the supplemental information for display.

2. The system of claim 1 wherein the supplemental information is displayed to a user through the network browser.

3. The system of claim 1 wherein the supplemental information is displayed on one or more remote display units.

4. A method comprising:
    displaying content by using a network browser; and
    in a computer system, receiving an electronic product code in response to an interrogation of a radio frequency identification (RFID) tag by an RFID reader, wherein the electronic product code is uniquely associated with an object to which the RFID tag is attached,
    navigating to a network location identified by the electronic product code using a network browser;
    accessing supplemental information from the network location, and
    preparing the supplemental information for display,
    wherein the object is identified by performing an electronic product code lookup and, following identification of the object, the content displayed by the network browser is automatically scanned to determine if the object is related to the content being displayed, and
    wherein accessing and preparing the supplemental information is performed only when the object is related to the content being displayed by the network browser.

5. The method of claim 4 wherein the supplemental information is displayed to a user on a user interface.

6. The method of claim 4 wherein the supplemental information is displayed on one of more remote user interfaces.

* * * * *